UNITED STATES PATENT OFFICE

ALONZO CHASE HAGER, OF MISSOULA, MONTANA.

PRESERVING COMPOUND AND PROCESS OF MAKING THE SA[

No. 806,540.     Specification of Letters Patent.     Patented Dec. 5

Application filed May 16, 1905. Serial No. 260,722.

*To all whom it may concern:*

Be it known that I, ALONZO CHASE HAGER, a citizen of the United States, and a resident of Missoula, in the county of Missoula and State of Montana, have invented certain new and useful Improvements in Preserving Compounds and Processes of Making the Same, of which the following is a full, clear, and exact description.

My invention relates to a process for preserving eggs, my more particular object being to enable the eggs to be kept fresh for comparatively long periods of time without injuring them as articles of food.

I take twenty gallons of clean water and add thereto six pounds of powdered quicklime, together with three pounds of salt, and stir thoroughly. I allow the admixture to stand twenty-four hours, stirring it at intervals. I next admix four ounces of cream of tartar, four ounces of nitrate of potash, four ounces of English soda, four ounces of borax, and four ounces of alum. I then dissolve these ingredients in hot water and allow the solution to stand until cooled. I add this to the solution of lime-water and stir thoroughly. I next place the solution in a barrel and fill the latter with eggs to within three inches of the top of the solution. I then take four ounces of beeswax, four ounces of rosin, and four ounces of tallow, melt the three ingredients last mentioned, boil them for ten minutes, and then pour the resulting liquid over the top of the solution in the barrel. I now allow the barrel to stand until the eggs are ready to be sold and then remove the eggs, washing them clean in a solution of clean water containing pearline. I next dry the eggs, whereupon they a for the market.

I have found upon actual trial t prepared as above described can be l fectly fresh for six months or longe

Having thus described my inve claim as new and desire to secure b; Patent—

1. A preservative compound co the following ingredients in substan{ proportions stated, to wit: water, gallons, powdered quicklime, six common salt, three pounds, cream ( four ounces, nitrate of potash, fou1 English soda, four ounces, borax, fou and alum, four ounces.

2. The process herein described paring a preservative, which consis{ ing twenty gallons of water, addin{ six pounds of powdered quicklime ɛ pounds of salt, stirring the same th( allowing the admixture to stand tw( hours, then admixing four ounces of tartar, four ounces of nitrate o four ounces of English soda, four ( borax and four ounces of alum, c said last-mentioned ingredients in h allowing the solution to stand unt then adding said solution to said 1 tioned admixture, and stirring th In testimony whereof I have si name to this specification in the pɪ two subscribing witnesses.

ALONZO CHASE H

Witnesses:
JOHN M. EVANS,
E. A. PALMER.